United States Patent [19]
Goto

[11] Patent Number: 5,958,213
[45] Date of Patent: Sep. 28, 1999

[54] WATER TREATMENT METHOD AND APPARATUS FOR WATER CONTAINING OIL DROPLETS

[75] Inventor: Nobutaka Goto, Tokyo, Japan

[73] Assignee: Konica Corporation, Japan

[21] Appl. No.: 08/923,805

[22] Filed: Sep. 4, 1997

[30] Foreign Application Priority Data

Sep. 18, 1996 [JP] Japan ..................................... 8-245988
Sep. 18, 1996 [JP] Japan ..................................... 8-245990

[51] Int. Cl.[6] .............................. C02F 1/461; C25B 9/00; C25B 1/00
[52] U.S. Cl. ...................... 205/754; 204/229.6; 204/275; 204/284; 204/292; 204/294; 204/666; 204/665; 204/647; 204/672; 204/673
[58] Field of Search ..................................... 204/228, 269, 204/292, 240, 666, 672, 673, 665, 229.6, 275, 284, 294, 647; 205/754

[56] References Cited

U.S. PATENT DOCUMENTS

| | | | |
|---|---|---|---|
| 4,233,132 | 11/1980 | Carr et al. | 204/228 X |
| 4,469,582 | 9/1984 | Sublette et al. | 204/666 |
| 4,770,755 | 9/1988 | Valanti et al. | 204/228 X |
| 5,597,479 | 1/1997 | Johnson | 204/228 X |
| 5,807,473 | 9/1998 | Sadler et al. | 204/228 X |

*Primary Examiner*—Donald R. Valentine
*Attorney, Agent, or Firm*—Jordan B. Bierman; Bierman, Muserlian and Lucas

[57] ABSTRACT

A water treating apparatus for treating water, includes: an oil drop separator for separating oil drops from water to be treated which has an electrode in which an anode is made of amphoteric metal, a power source for supplying an electric power to the electrode, a treating tank for housing the electrode and the water, a water inlet through which the water is led to the treating tank, and a water outlet through which the treated water is exhausted from the treating tank; and a three-dimensional fixed bed type electrolytic tank for treating the water which has been treated by the oil drop separator which has a fixed bed type electrode, a power source for supplying an electric power in which a polarity is reversed periodically, to the fixed bed type electrode, a treating tank for housing the fixed bed type electrode and the water, a water inlet through which the water is led to the treating tank, and a water outlet through which the treated water is exhausted from the treating tank. The apparatus further includes leading device for leading the water exhausted from the water outlet of the oil drop separator to the water inlet of the three-dimensional fixed bed type electrolytic tank.

17 Claims, 5 Drawing Sheets

WATER TREATMENT METHOD AND APPARATUS FOR WATER CONTAINING OIL DROPLETS

BACKGROUND OF THE INVENTION

The present invention relates to a water treatment method for electrochemically treating water to be treated containing oil droplets and microorganisms.

Recently, industrial water is reused extensively, wherein various impurities contained in industrial water which has been used once are removed through separation so that the industrial water can be reused. In general, impurities contained in each industrial water are already-known in terms of components, and therefore, the components are separated and removed after being aimed in many cases.

For example, processing water used for food processing is abundant in nutritive substances, and therefore microorganisms such as bacteria therein breed, which makes it impossible to reuse the processing water without treating as processing water for food processing. It is impossible to act on these microorganisms such as bacteria with anti-mold agents or with sterilizers, because it is apprehended that the anti-mold agents or sterilizers used are mixed in foods. Therefore, it has been desired that such processing water is simply treated and reused as water in an aseptic condition.

As a water treatment method free from the disadvantages mentioned above, TOKKAIHEI Nos. 3-224686 and 4-27488 disclose a method to treat electrochemically. In this method, it is possible to treat a huge amount of water efficiently without using any specific chemicals.

However, in the case of processing water used for food processing, once it is used, oil ingredients liquated out of the foods become oil droplets and are mixed in the processing water. When water to be treated containing oil droplets is treated, without taking any action on it, in the method mentioned above, blocking on an electrode is caused, or the surface of the electrode is masked with oil ingredients, which makes sterilizing treatment impossible in a short period of time. In addition, the oil droplets serve as the nutrition source for microorganisms and bacteria existing in processing water, or the oil droplets stick to processed foods to adversely affect the foods including lowering commercial value of the foods. In particular, it is desired that washing water for broilers or bean curd is used repeatedly many times because of low cooling temperature, from the viewpoint of energy conservation. However, as stated above, processing water used for the aforesaid items is mixed with oil droplets after it is once used, and it adversely affects in many ways, thus an appropriate method for eliminating the oil droplets has been desired.

Heretofore, these oil droplets have been scrubbed out through methods including one for removing them physically using microfilters and others, and one for removing them after adding activated carbons or coagulants to them. However, expenses for the removal of the oil droplets in those methods have been higher than expected and treatment capacity in each of the methods has been low, thus, the methods have been regarded to be problematic.

On the other hand, for separation of suspended substances in water, there are available floatation separation methods wherein there are introduced fine air bubbles each sticking to a suspended particle to separate it. One of the floatation separation methods is an electrolytic floatation separation method.

With regard to separation of oil droplets through an electrolytic floatation separation method, TOKKAIHEI 2-40286, for example, discloses that fine particles contained in grinding oil used in machining by machine tools or a colloid solution used in the field of civil engineering and construction are electrolyzed, and metal ions generated by the electrolysis are caused to stick to fine particles and ions hydroxide and to surface to be removed. TOKKAIHEI 5-337472 discloses that when removing suspended substances remaining in waste water treated with coagulants, the water to be treated passes through a plurality of electrodes arranged horizontally and further passes through electrodes arranged vertically to be electrolyzed in the course of the passage, thus suspended substances become flock and are caused to surface to be removed. In TOKKAIHEI 2-222771, a plurality of electrodes are provided obliquely so that voltage can be impressed uniformly on water to be treated to accelerate generation of flock bubbles. In TOKKAIHEI 4-300694, there are provided a cylindrical aluminum anode and a thin aluminum pipe representing a cathode located at the center of the anode, and water to be treated is caused to pass through the cylinder to be electrolyzed so that suspended substances may surface to be removed. Since scale is generated and sticks to an aluminum electrode, especially cathode, in an electrolytic floatation method, a method to prevent that is disclosed in TOKKAIHEI 6-142407. TOKKAIHEI 5-50070 discloses that when a plurality of insoluble electrodes each being a metal base of titanium, tantalum, or niobium covered with platinum having a thickness of several microns are used as an electrode, and a polarity of the electrode is reversed at certain intervals, it is possible to clean water to be treated for a long time through electrolytic floatation without replacing electrodes. Furthermore, TOKKAIHEI 5-253509 discloses that a plurality of aluminum sheets are used as an electrode, and polarity of the electrodes is reversed at certain intervals to separate oil components from oil-containing bilge water generated from an engine room of a ship through an electrolytic floatation method. However, when water from which oil drops have been separated through the electrolytic floatation method is treated by the method employing a fix bed type electrolytic tank described in TOKKAIHEIs 3-224686 and 4-27488, metal ions generated in the electrolytic floatation method are mixed in the water to be treated, and compounds of the metal ions cause clogging on electrodes in the fixed bed type electrolytic tank, making sterilization impossible in a short period of time, which has been a serious problem.

SUMMARY OF THE INVENTION

An object of the invention is to provide a water treatment apparatus to treat water to be treated containing oil droplets and microorganisms to scrub out the oil droplets and microorganisms. More particularly, the object is to provide a water treatment apparatus which can treat water stably for a long time without having a problem of clogging on electrodes, when treating water by separating oil droplets through an electrolytic floatation method and by sterilizing with a fixed bed type electrolytic tank.

The object of the invention mentioned above has been attained by the following structure.

A water treatment apparatus for treating water, including:
an oil drop separating means, having therein
electrodes wherein anodes are made of amphoteric metal,
a power source to supply electric power to the electrodes,
a treating tank housing the electrodes and water, a water inlet through which water is led to the treating tank, and a water outlet through which the treated water is ejected out of the treating tank;

a 3-D fixed bed type electrolytic tank for treating water treated by the oil drop separating means, having therein fixed bed type electrodes, power source supplying electric power whose polarity is reversed alternately to the fixed bed type electrodes, a treating tank housing therein the fixed bed type electrodes and water, a water inlet through which water is led to the treating tank, and a water outlet through which the treated water is ejected out of the treating tank; and a means to lead water ejected from the water outlet of the oil drop separating means to the water inlet of the 3-D fixed bed type electrolytic tank.

DETAILED DESCRIPTION OF THE PREFERRED EMBODIMENT

Figure 1:
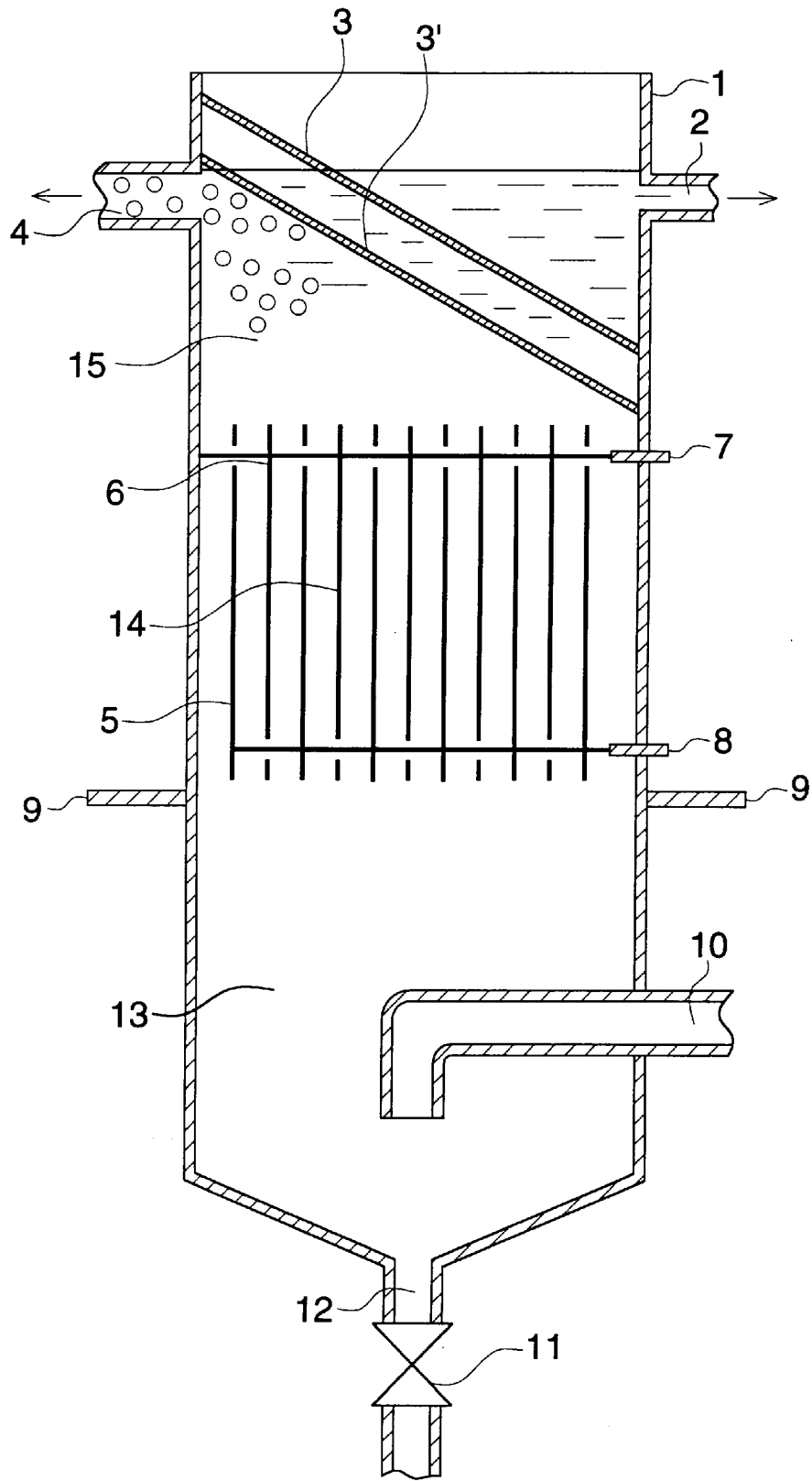
FIG. 1 is a sectional view of the inside of a treating tank of an oil drop separating means.

The invention will be explained in detail, referring to the following example to which the invention is not limited. In general, when obtaining processing water containing no microorganisms by treating water to be treated containing microorganisms, an electrochemical treatment is generally favorable for the reuse of water for food processing, because the electrochemical treatment is efficient and it does not require unnecessary chemicals (for example, anti-mold agents and sterilizer). In the invention, a 3-D fixed bed type electrolytic tank is used as an apparatus for treating electrochemically. The 3-D fixed bed type electrolytic tank used favorably in the invention is an electrolytic tank with multi-electrodes of a fixed bed type wherein a supporting member is provided at a part of an opening located at the lower part of an tubular object which houses plural fixed bed type 3-D electrodes to prevent the plural fixed bed type 3-D electrodes from drifting away from the tubular object.

When water to be treated containing oil droplets is led to a 3-D fixed bed multi-electrode type electrolytic tank without taking any action, oil droplets stick to electrodes to block a flow of water to be treated, making it impossible to treat water in a short period of time. Inventors of the invention tried various methods to remove oil droplets without adding chemicals such as coagulants to water to be treated, and attained the object with an oil droplet separating apparatus having the aforesaid constitution.

A water treatment apparatus used in the invention will be explained. At least anodes of electrodes in a treating tank of an oil droplet separating means are made of amphoteric metal. The amphoteric metal is represented by zinc, cadmium, aluminum, gallium, indium, tin, lead, arsenic, antimony and bismuth, among which aluminum is used most preferably from the viewpoint of environmental matter. When aluminum is used for anodes, an aluminum ion liquating out slightly in the course of electrolysis coagulates suspended matters contained in water to be treated, accelerates oil droplets to be coagulated into a bigger oil droplet, and further promotes that small air bubbles generated on the surface of a cathode stick to the surface of an oil droplet to separate oil droplets from water to be treated. Moreover, the treated water is mostly free from the aluminum ion, because the aluminum ion is exhausted out together with oil droplets. Granting that the aluminum ion is contained in the treated water, its amount is very small, and no problem is caused even when the treated water is used as water for food processing. In addition, cathodes may also be made of amphoteric metal. In this case, again, the most preferable is aluminum. In addition, in the invention, when plural electrodes are made of amphoteric metal and when polarity of an electrode is reversed alternately, the electrode is worn away evenly and the surface of the electrode is granulated. Therefore, bubbles generated in the course of electrolysis are smaller, which results in an improvement of an efficiency of separating oil drops.

Electrodes arranged vertically in a treating tank of an oil droplet separating apparatus of the invention make oil droplets to come up easily, and oil droplets which have come up are led to a flocked bubble outlet representing an exhaust port, to be ejected by a shielding plate arranged obliquely. At the lower portion of the treating tank, on the other hand, there is provided a solid matter outlet representing a solid matter exhaust port which periodically removes solid matters mixed with water to be treated, to prevent that an inner wall of the treating tank is blocked with solid matters, and to separate oil droplets smoothly. Incidentally, when an amount of solid matters is large, it is preferable that solid matters are removed with a filter before water to be treated is led to the treating tank, while when each of solid matters is light and small, it is preferable to provide a filter beneath electrodes to prevent that these solid matters go with the liquid stream and are led to the electrode section.

In the present example, an anode/cathode current value of not less than 0.1 $A/dm^2$ on electrodes in the treating tank is preferable, and that of 0.15–5.0 $A/dm^2$ is more preferable. Current density of not less than 0.1 A/l in the treating tank is preferable, and that of 0.15–10 A/l is more preferable.

Figure 5:
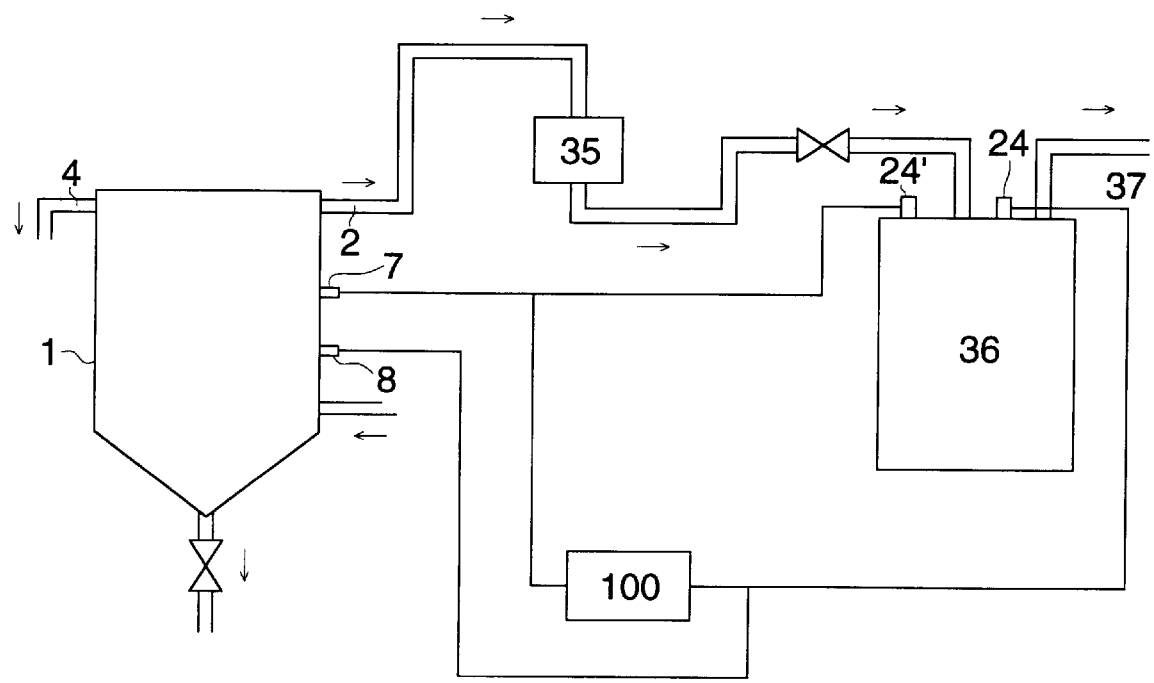
FIG. 5 is a block diagram of a water treatment apparatus of the invention.

FIG. 5 represents a block diagram of a water treatment apparatus to which an oil drop separating means and a 3-D fixed bed multi-electrode type electrolytic tank are connected. Water to be treated is led to treating tank 1 of the oil drop separating means through water to be treated inlet 10, separated oil drops are ejected through flocked bubble outlet 4, and treated water is ejected through treated water outlet 2. Treated water which has become free from oil components passes through filtering device 35 connected to the lower portion of the oil/water separating device 33, where solid matters in the treated water are removed, and is led to 3-D fixed bed multi-electrode type electrolytic tank 36. The treated water sterilized by the 3-D fixed bed multi-electrode type electrolytic tank 36 is ejected to be used again as treated water. A power source to supply electric power to an oil drop separating means and a power source to supply electric power to a 3-D fixed bed multi-electrode type electrolytic tank are represented by common power source 100 in the present example, and the oil drop separating means and 3-D fixed bed multi-electrode type electrolytic tank 36 are connected in parallel. This constitution is preferable because it prevents the problems caused in the case of the connection of the aforesaid items in series that excessive electric power is supplied to the 3-D fixed bed multi-electrode type electrolytic tank and electricity leaks through water when a different power source is used. The power source 100 is one to supply electric power by reversing polarity alternately, and it is preferably for alternating current ranging in terms of frequency from 10 Hz to $1\times10^{-5}$ Hz.

Figure 2:
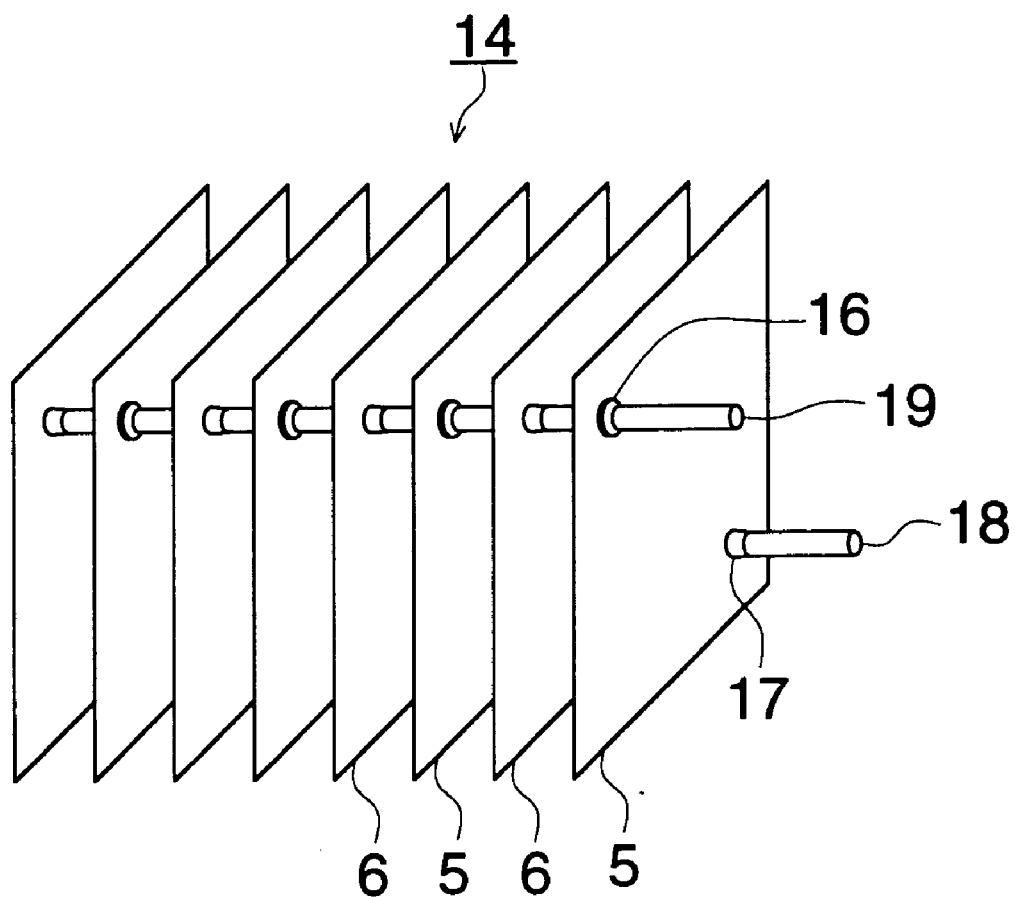
FIG. 2 is a perspective view of an electrode section in the treating tank.

Next, the framework in treating tank 1 of an oil drop separating means in FIG. 1 will be explained. The treating tank 1 is provided, on its upper part, with treated water outlet 2 and flocked bubble outlet 4, and water to be treated is led thereto through water to be treated inlet 10 located at the lower part of the treating tank 1. Large solid matters in the water to be treated thus led into the treating tank sink at solid matter separating section 13 located at the lower part of the treating tank and are accumulated in the vicinity of solid matter outlet 12. Thus, water to be treated containing oil droplets goes up and passes through electrode section 14. FIG. 2 shows a perspective view of the electrode section 14 wherein aluminum electrode 5 that is one of a pair of electrodes is connected with electrode rod 19 through connecting portion 16 to be arranged alternately with the other of the pair, while aluminum electrode 6 that is the other of the pair is connected with electrode rod 18 in a way that hole 17 is formed on the aluminum electrode 5 so that the electrode rod 18 may pass through the aluminum electrode 5 without touching it. The same action is taken also on the electrode 6, and electrode rod 19 does not touch the electrode 6. In the invention, there is no diaphragm between electrodes. The electrode rods 18 and 19 are connected respectively to power supply terminals 7 and 8 both of which are connected to the power source 100 mentioned above so that power with different polarity may be supplied from the outside. In each of power supply terminals 7 and 8, the polarity of power is reversed alternately. Namely, when positive power is supplied from the power supply terminal 7, the power supply terminal 8 supplies negative power, while when negative power is supplied from the power supply terminal 7, to the contrary, the power supply terminal 8 supplies positive power. Incidentally, it is preferable that electric power supplied by the power source is alternating current ranging in terms of frequency from 10 Hz to $1\times10^{-5}$ Hz. In the electrode section 14, therefore, electrolysis takes place between aluminum electrodes 5 and 6 in each pair of electrodes, and tiny hydrogen bubbles generated from a cathode stick to the surface of an oil drop, which makes specific gravity of the oil drop to be extremely small and generates relatively large flocked bubbles which rise. Flocked bubbles which have risen are led to flocked bubble outlet 4 to be ejected out by shielding plate 3' provided obliquely, in flocked bubble separating section 15. Water to be treated from which oil droplets have been separated is ejected through treated water outlet 2 to be used again for processing. Shielding plate 3 is provided in parallel with shielding plate 3' so that flocked bubbles may not be mixed with treated water, thus separation of oil droplets is made perfect. The shielding plate is provided to be inclined by an angle of 30° to the level surface. It is preferable that shielding plates 3 and 3' are represented by a net with an extremely fine mesh. The treating tank 1 is installed vertically due to its flange 9, and a horizontal section of the treating tank is rectangular. Solid matters are ejected periodically by opening valve 11 provided on solid matter outlet 12. Incidentally, it is possible to use, as the power source of the invention, either the power source capable of reversing the polarity alternately or the ordinary power source provided with a polarity changing device capable of reversing the polarity of power alternately. It is preferable that each aluminum electrode is plate-shaped, but it may also be of a rod type.

The 3-D fixed bed multi-electrode type electrolytic tank of the invention will be explained, next. When the 3-D fixed bed multi-electrode type electrolytic tank is used for refining processing for water to be treated, it is desirable that voltage to be impressed is set so that anode voltage is in a range of +0.2 to +1.2 V (vs. SCE) which substantially causes no generation of oxygen and cathode voltage is in a range of 0 to −1.0 V (vs. SCE) which substantially causes no generation of hydrogen. However, when substances in a liquid are not subjected to oxidation/reduction reaction and liquid characteristics are not changed, or when an amount of the reaction does not matter much, it is also possible to make the anode voltage to be lower than +1.6 V (vs. SHE) and make the cathode voltage to be higher than −1.5 V (vs. SHE). Or, when the electrode reaction does not matter, higher voltage may be impressed.

When gases are generated in the case of refining a large amount of water to be treated in refining the water to be treated, the generated gases, namely, an oxygen gas and a hydrogen gas are usually generated at a mixture ratio within an explosion limit. It is therefore preferable, to prevent a hazard of explosion, that the generated gases are diluted with an inert gas such as air. For example, it is possible to install a separation means for an electrolysis gas generated at an outlet of a 3-D fixed bed multi-electrode type electrolytic tank, and an electrolysis gas diluting means which dilutes the separated electrolysis gas with air to make the hydrogen gas concentration in the electrolysis gas to be not more than 4% by volume.

Electrodes in a 3-D fixed bed multi-electrode type electrolytic tank of the invention include a fixed bed type 3-D electrode and an electrode for supplying power, and the fixed bed type 3-D electrode may be represented by a plurality of electrodes which are preferably granular, spherical, fibrous, felt-shaped, woven-cloth-shaped, porous-block-shaped or spongy, and are made of porous material making water to be treated to pass through, such as, for example, carbon group materials including activated carbon, graphite, carbon fiber, and glassy carbon, all having a granular shape, a spherical shape, a felt shape, a woven-cloth shape or a porous-block shape, or metallic materials such as nickel, copper, stainless steel, iron and titanium, all having the same shapes as the foregoing, or materials in which the aforesaid metallic materials are coated with noble metal. Incidentally, compared with electrodes of a floating type wherein electrodes are dispersed in a liquid, fixed bed type electrodes mean those wherein each electrode hardly moves. When the electrodes are fixed in general, they may be moved periodically.

In the invention, it is preferable that fixed bed type 3-D electrodes are represented by porous graphite having an average hole diameter of 20–100 μm. These are porous fixed bed type 3-D electrodes which are made in a manner where plural sheets made of vegetable fibers and laminated by the use of an organic matter binder, for example, the sheets of Japanese paper are subjected to heat treatment to be carbonized at the temperature of 1000° or higher in an atmosphere of inert gas, and are further heated to become graphite. More preferably, porous fixed bed type 3-D electrode plates prepared in a way where plural sheets made of synthetic fiber are laminated and pressed by the use of an organic matter binder, then are heat-treated to be carbonized, and further heated to become graphite, are preferable because they contain less impurities and diameters of their pores can easily be controlled. In particular, the porous electrode plate is hardly clogged because a width of the pore diameter distribution for the aimed pore diameter is narrow and sharp. For the organic matter binder used for the application mentioned above, it is possible to use thermoplastic resins such as phenol resin, epoxy resin, furan resin and divinylbenzene resin, to which the invention is not limited in particular. With regard to the sheets made of synthetic fiber, those of a type of nonwoven cloth are preferable, although those of a woven type are also acceptable.

These plural laminated fixed beds are housed in a tubular object whose both ends at the top and the bottom are opened. The tubular object is preferably made of an electric insulating material which is durable for the use for a long time or the repeated use, and in particular, synthetic resins such as polyepichlorohydrin, polyvinylmethacrylate, polyethylene, polypropylene, polyvinylchloride, polyethylenechloride, phenolformaldehyde resin, ABS resin, acrylic resin and polycarbonate can be used. When the fixed beds are made of transparent or translucent materials, how the fixed beds are worn out can be observed and confirmed, which is convenient.

Since a diameter of the aforesaid plural fixed bed type 3-D electrodes housed in the tubular object is equal to or slightly smaller than the inside diameter of the tubular object, when an operation such as replacement of the fixed bed type 3-D electrode or the like is conducted by holding only the tubular object, the fixed beds slip out of the lower opening, making it impossible to house a prescribed number of fixed beds in the tubular object.

Therefore, in the 3-D fixed bed multi-electrode type electrolytic tank related to the invention, it is preferable that a supporter is provided to block a part of the lower or upper opening of the tubular object so that the fixed beds may be prevented from coming off, namely from falling out of the tubular object. The shape of the supporter is not restricted in particular provided that the supporter has its strength that is enough to control the movement of the plural fixed beds, and it is possible to fix a doughnut-shaped member at the bottom portion of the tubular object through welding or gluing so that the doughnut-shaped member may block a part of the opening, or to install a member having the same form as the foregoing through solid molding, or to fix a "+"-shaped member through gluing so that the "+"-shaped member may cover the circumferential portion at the bottom of the tubular object, or to install a mesh-shaped member in the opening in the same manner. It is also possible to form threads on both the doughnut-shaped member and the tubular object so that both members may be screw-fixed to each other. A supporter may also be installed on the upper portion of the opening through screw-fixing in the same way, and these arrangements can make the fixed beds to be housed more stably in the tubular object.

It is preferable that a sectional area of the supporter on a plane perpendicular to the flow direction of water to be treated is 3–50% of the area of opening of the opening portion, and when it is less than 3%, the supporter easily comes off the tubular object due to insufficient strength, while when it exceeds 50%, the flow of water to be treated is inhibited, and electrolysis voltage easily rises.

It is possible to cause a 3-D fixed bed multi-electrode type electrolytic tank to house 3-D electrodes wherein the fixed beds are placed in DC or AC electric field, then DC voltage or AC voltage is impressed between power supplying electrode terminals each being composed of a flat-plate-shaped, expand-mesh-shaped or perforated-plate-shaped porous plate to make the fixed beds to be polarized, and whereby an anode and a cathode are formed respectively on one end and the other end of the fixed bed through polarization. In addition, it is possible to provide 3-D materials each functioning as an anode or a cathode independently alternately in a way that they are not short-circuited, and to connect them electrically to make a 3-D fixed bed multi-electrode type electrolytic tank.

As materials of the power supplying anode terminals, there are available some materials formed, for example, by carbon graphite materials (carbon fiber, carbon cloth, graphite etc.), carbon compound materials (those obtained by mixing metal powder in carbon and by sintering them), activated carbon fiber nonwoven cloth (for example, KE-1000 Felt made by TOYOBO CO. LTD.) or materials wherein the aforesaid materials carry platinum, palladium or nickel, further, dimension-stabilizing electrodes (platinum-group-oxide-coated titanium materials), platinum-coated titanium materials, nickel materials, stainless steel materials and iron materials. A power supplying cathode terminals facing the power supplying anode terminals to give DC voltage can be formed by platinum, stainless steel, titanium, nickel, copper, Hastelloy, graphite, carbon materials, and metallic materials coated with soft copper or platinum metal group metal.

When water to be treated is treated while oxygen gases are being generated from anodes under the condition that a carbon type material such as activated carbon, graphite or carbon fiber is used for the fixed bed, the fixed bed is oxidized by the oxygen gases to be easily dissolved as carbon dioxide. Or, fine powder of destroyed electrode materials are generated. For preventing this, platinum group metal oxide such as iridium oxide or ruthenium oxide can be coated on a board of titanium or the like at the side of the fixed bed where positive polarization takes place, and porous material or mesh-shaped material which is generally used as insoluble metal electrode can be provided to be in contact with the board, so that oxygen may be generated on that material.

Figure 3:
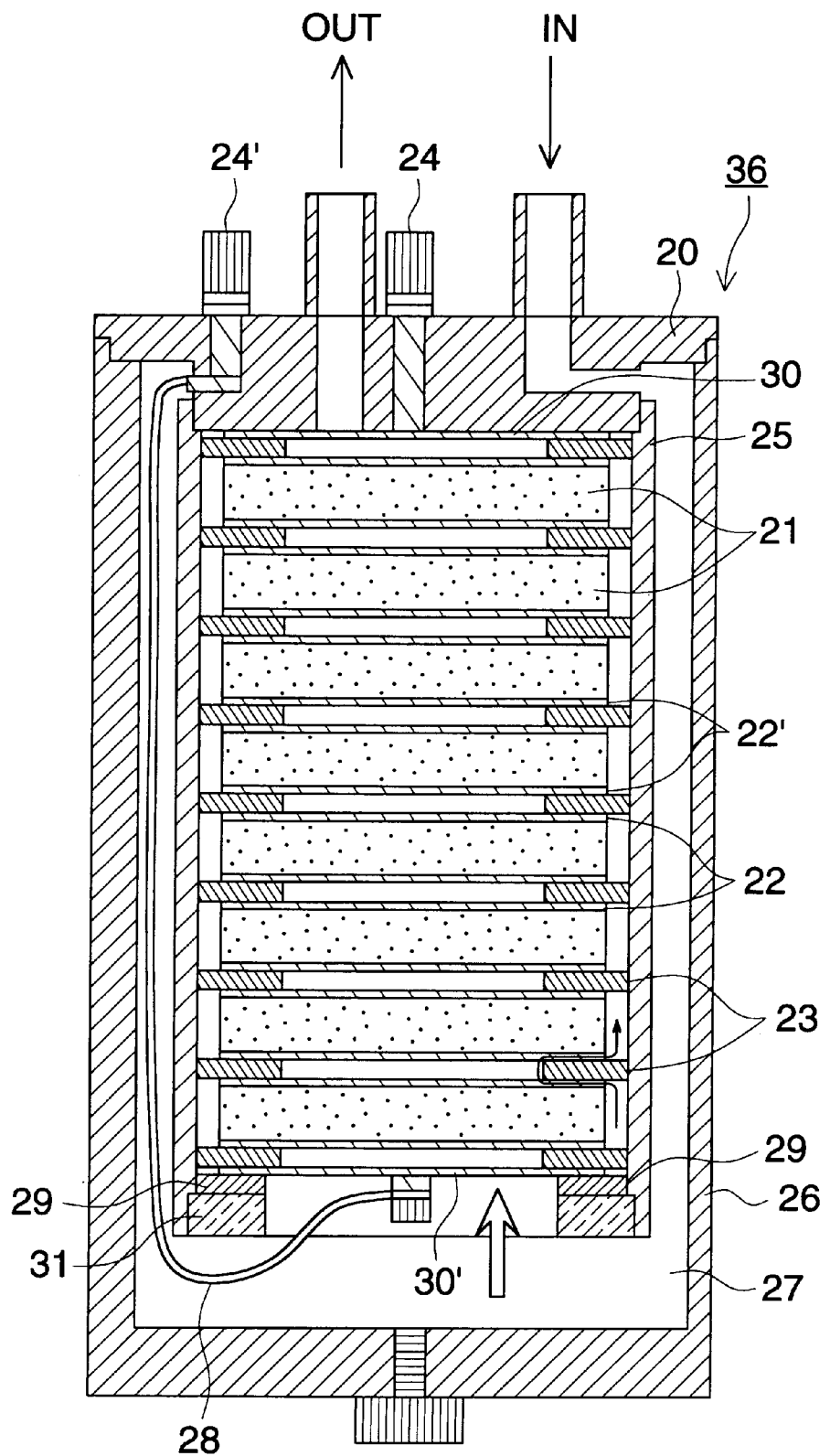
FIG. 3 is a longitudinal section of an electrolytic tank with multi-electrodes of a 3-D fixed bed type.

FIG. 3 is a longitudinal section of a 3-D fixed bed multi-electrode type electrolytic tank of the invention. Water to be treated led through an inlet (IN) located at the upper part of the electrolytic tank comes down along space 27 (a water to be treated introductory path) formed between inner cylinder 25 and outer cylinder 26 of the electrolytic tank Then, the Water to be treated is moved upward in accordance with an arrow mark, in which electric power reversed in terms of polarity alternately is supplied from electrode terminals 24 and 24' connected to power source 100, and when the water to be treated passes through fixed bed type 3-D electrode 21 sandwiched between auxiliary electrodes 22 and 22', bacteria contained in the water to be treated are sterilized. Electric power supplied from the outside passes through electrode terminal 24 and is supplied to auxiliary electrode 22 through power supplying electrode 30, while electric power to be supplied to electrode terminal 24' passes through lead wire 28, then arrives at the lower part of the electrolytic tank, and is supplied to auxiliary electrode 22' through power supplying electrode 30'. Since each of the fixed bed type 3-D electrodes is sandwiched between auxiliary electrodes 22 and 22' and is laminated, the fixed bed type 3-D electrodes are polarized, covering from the lower part to the upper part thereof. Each fixed bed type 3-D electrode and auxiliary electrodes 22 and 22' sandwiching the fixed bed type 3-D electrode are sealed with gasket 23 to form a set so that water to be treated may not leak from the side of the set. These sets are stacked on lower part fixing ring 31 and spacer 29 to be set, and upper cover 20 and outer cylinder 26 are engaged with each other through threads thereon. With regard to electric power supplied from a power source to a 3-D fixed bed multi-electrode type electrolytic tank, it is preferable that it is alternating current ranging in terms of frequency from 10 Hz to $1 \times 10^{-5}$ Hz and having a value of current of not more than 0.5 A. Even when clogging is caused on fixed bed type electrodes by compounds based on metal ions generated in an oil drop separating means and mixed in water to be treated, for example, by aluminum hydroxide, the aluminum hydroxide is changed to aluminum ions again to be dissolved for the reason that the generated metal ions are those of amphoteric metal and polarity is reversed alternately. Therefore, clogging on electrodes can be prevented and water can be treated stably for a long time.

Figure 4:
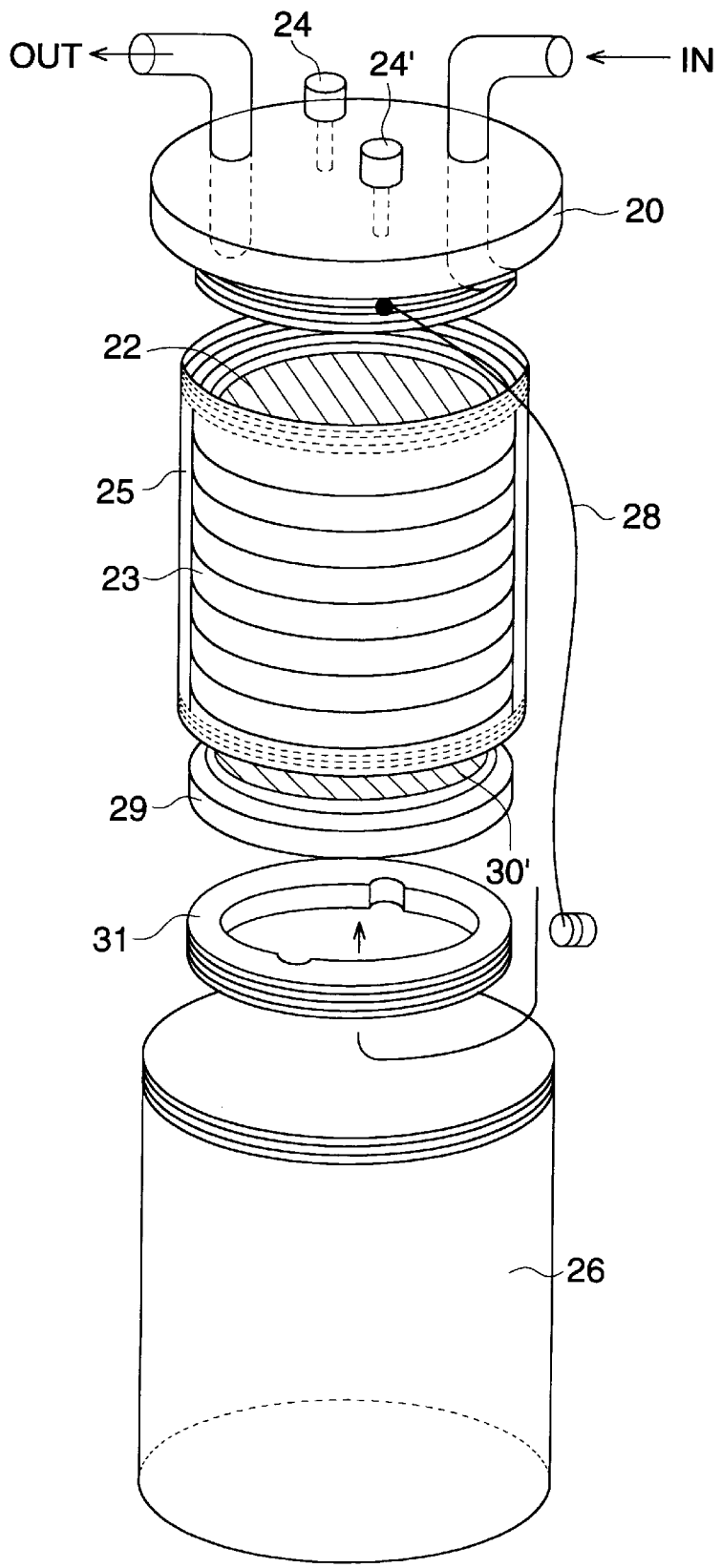
FIG. 4 is an exploded perspective view of the electrolytic tank with multi-electrodes of a 3-D fixed bed type.

FIG. 4 is an exploded perspective view of a 3-D fixed bed multi-electrode type electrolytic tank housing therein fixed beds of the invention. Fixed beds are inserted through the inner cylinder 25 to be laminated, and the lower part fixing ring 31 is engaged with the screw located at the lower part of the inner cylinder 25 which is then engaged with an inner screw of upper cover 20 so that no water may leak. After lead wire 28 is connected to power supplying electrode 30' located at the lower part, the outer cylinder 26 is engaged with the upper cover through threads thereon.

Water to be treated applied to the water treatment method in the invention is preferably treating water for food processing. In the case of the treating water for food processing, it is required that mixture of unnecessary compounds in foods to be processed is prevented to the utmost. From that viewpoint, the water treatment method of the invention makes it possible to separate oil droplets contained in water to be treated and to sterilize microorganisms without using chemical substances such as coagulants, anti-mold agents and sterilizing agents and without using specific equipment for separating and removing oil components.

EXAMPLE 1

Water to be treated was treated by a water treatment apparatus shown in FIG. 5. Particularly, it was treated by a treating tank of the invention shown in FIG. 1, then was temporarily stored in an oil/water separation equipment as shown in FIG. 5, and was led to a 3-D fixed bed multi-electrode type electrolytic tank shown in FIG. 3 to be treated after passing through a filtering equipment. Following conditions are for the water to be treated used.

General bacteria separated from ion-exchange water through an ordinary agar culture medium (made by EIKEN KAGAKU) were cultured for three days by the use of a liquid culture medium (ordinary bouillon culture medium, made by EIKEN KAGAKU), and fungus bodies were subjected to centrifugal separation at the speed of 5000 rpm, then were washed with pure water, and again were subjected to centrifugal separation. These were added to stocked tap water (residual chlorine concentration is not more than 0.02 ppm) containing oil drops measuring 1–100 $\mu$m at the rate of 300 ppm to prepare water to be treated. The plate count was $6.5 \times 10^4$ CFU.

Following conditions were for the treating tank for separating oil droplets.
Electrolysis conditions
Anode: aluminum (anode current density 0.15 A/dm$^2$)
Cathode: aluminum (cathode current density 0.15 A/dm$^2$)
Electrolysis voltage: 8.0 V Electrolytic tank conditions
Electrolytic tank current concentration: 0.12 A/l
Electrolysis current: AC current with 10 Hz or less (Power source is common with a 3-D fixed bed multi-electrode type electrolytic tank)
Current waveform: Pulse current or smooth current with ripple rate of 5% or less
Time of staying in electrolytic tank: 5.6 sec
Electrode interval: 10 mm
In the 3-D fixed bed multi-electrode type electrolytic tank, a titanium mesh (thickness 1 mm) coated with platinum was used as an auxiliary electrode, and DC 34 V was impressed on an electrode terminal.

After treating water to be treated in quantity of 1 m$^2$, no clogging was observed, and the plate count was reduced to 63 CFU in treated water at an outlet on the 3-D fixed bed multi-electrode type electrolytic tank. In addition, it is verified by no change in electrolysis voltage and electrolysis current that masking of oil component on a graphite electrode of the 3-D fixed bed multi-electrode type electrolytic tank was not caused.

EXAMPLE 2

Washing water for broilers was treated continuously for one week by the use of equipment in Example 1. Washing water for broilers contained oil droplets measuring 1–100 $\mu$m at the rate of 200–500 ppm, and it slightly contained bacteria. However, even after one week, no clogging was observed, and plate count was not more than 100 CFU, showing no trouble in practical use.

Owing to the invention, water to be treated containing oil droplets and microorganisms was able to be treated stably for a long time.

What is claimed is:
1. A water treating apparatus for treating water, comprising:
    (a) oil drop separator for separating oil drops from water to be treated, comprising
        (1) an electrode in which an anode is made of amphoteric metal,
        (2) a first power source for supplying an electric power to the electrode,
        (3) a first treating tank for housing therein the electrode and the water to be treated,
        (4) a first water inlet through which the water is led to the first treating tank, and
        (5) a first water outlet through which the treated water is exhausted from the first treating tank;
    (b) a three-dimensional fixed bed electrolytic tank for treating the water which has been treated by the oil drop separator, comprising
        (1) a fixed bed electrode,
        (2) a second power source for supplying an electric power in which a polarity is reversed periodically, to the fixed bed electrode,
        (3) a second treating tank for housing therein the fixed bed electrode and the water to be treated,
        (4) a second water inlet through which the water is led to the second treating tank, and
        (5) a second water outlet through which the treated water is exhausted from the second treating tank; and
    (c) an element for leading the water exhausted from the first water outlet of the oil drop separating means to the second water inlet of the three-dimensional fixed bed electrolytic tank.

2. The water treating apparatus of claim 1, wherein the anode of the electrode in the oil drop separating means is made of aluminum.

3. The water treating apparatus of claim 1, wherein the oil drop separator includes a plurality of electrodes which are made of amphoteric metal, and the first power source adapted to supply an electric power in which the polarity is reversed periodically, to the plurality of electrodes.

4. The apparatus of claim 3 adapted to provide an alternating-current having a frequency of $10^{-5}$ to 10 Hz.

5. The water treating apparatus of claim 1, wherein either the first power source or the second power source is adapted to be a common power source with each other, and the oil drop separator and the three-dimensional fixed bed electrolytic tank are connected in parallel relative to the common power source.

6. The apparatus of claim 1, wherein
the electrode includes a plurality of electrodes made of amphoteric metal, and
the first power source is adapted to supply an electric power in which the polarity is reversed periodically, to the plurality of electrodes so that respective polarities of the plurality of electrodes are reversed periodically;
and the apparatus further comprising:
a shielding plate provided obliquely with respect to a horizontal plane in an upper part of the treating tank for leading the water so that the shielding plate is may be contact with the water stored in the treating tank; and
an oil outlet provided in the upper part of the treating tank, through which the oil drops may be led by the shielding plate and thereby surfaced, and then exhausted.

7. The apparatus of claim 1, wherein a surface of the electrode of the oil drop separator is disposed in a vertical direction.

8. The apparatus of claim 1, wherein the oil drop separator has a plurality of electrodes made of amphoteric metal, and no diaphragm is disposed between each of the plurality of electrodes.

9. The apparatus of claim 1, wherein the three-dimensional fixed bed electrolytic tank is a three-dimensional fixed bed multi-electrode electrolytic tank including a plurality of carbon fixed beds each which is interposed by two auxiliary metal electrodes.

10. The apparatus of claim 1 further comprising a filtering facilities provided between the oil drop separator and the three-dimensional fixed bed electrolytic tank for filtering residual solid matters in the water.

11. The apparatus of claim 1 adapted to provide a current density between an anode and a cathode of the electrodes of the oil drop separator of not less than 0.1 A/dm$^2$.

12. The apparatus of claim 1 adapted to provide a current concentration in the oil drop separator of not less than 0.1 A/liter.

13. A method of separating oil drops from raw water comprising
introducing said raw water into a first treating zone, supplying first electric power to said raw water through a separating electrode made of amphoteric metal to form partially treated water;
introducing said partially treated water into a second treating zone, supplying second electric power to said partially treated water through a three dimensional fixed bed electrode, reversing polarity of said second electric power periodically to form fully treated water, and removing said fully treated water from said second treating zone.

14. The method of claim 13 wherein a current density between an anode and a cathode of said separating electrode is at least 0.1 A/dm$^2$.

15. The method of claim 13 wherein a current concentration in said first treatment zone is at least 0.1 A/liter.

16. The method of claim 13 wherein said first electric power is alternating current having a frequency of $10^{-5}$ to 10 Hz.

17. The method of claim 13 wherein said raw water is to is adapted for food processing.

* * * * *